(12) United States Patent
Liu (10) Patent No.: US 11,486,435 B2
(45) Date of Patent: Nov. 1, 2022

(54) EXPANSION CONNECTOR (71) Applicant: Lusterful Science and Technology Co., Ltd., Qingyuan (CN)

(72) Inventor: Weiming Liu, Qingyuan (CN)

(73) Assignee: LUSTERFUL SCIENCE AND TECHNOLOGY CO., LTD., Qingyuan (CN)

( * ) Notice: Subject to any disclaimer, the term of this patent is extended or adjusted under 35 U.S.C. 154(b) by 316 days.

(21) Appl. No.: 17/001,707

(22) Filed: Aug. 25, 2020

(65) Prior Publication Data

US 2021/0180637 A1 Jun. 17, 2021

(30) Foreign Application Priority Data

Dec. 13, 2019 (CN) .......................... 201911288930.0

(51) Int. Cl.
*F16B 13/06* (2006.01)
*F16B 37/12* (2006.01)
*F16B 13/12* (2006.01)

(52) U.S. Cl.
CPC .......... *F16B 37/122* (2013.01); *F16B 13/124* (2013.01)

(58) Field of Classification Search
CPC .............................. F16B 37/122; F16B 13/124
USPC .......... 411/272, 295, 214, 271, 32, 33, 54.1, 411/551, 349, 80.5, 80.6, 55
See application file for complete search history.

(56) References Cited

U.S. PATENT DOCUMENTS

| | | | | |
|---|---|---|---|---|
| 1,247,621 A * | 11/1917 | Bennett | ................. | F16B 13/068 411/26 |
| 3,466,965 A * | 9/1969 | McCarthy | ............... | F16B 21/10 411/21 |
| 3,534,650 A * | 10/1970 | Kubokawa | ............ | F16B 19/109 411/21 |
| 4,553,889 A * | 11/1985 | Le Dantec | .............. | F16B 13/04 976/DIG. 176 |
| 4,693,389 A * | 9/1987 | Kalen | .................. | G21C 13/067 976/DIG. 176 |
| 9,987,967 B1 * | 6/2018 | Kimble | ................. | B60P 7/0807 |
| 2007/0029819 A1 * | 2/2007 | Kitzis | ..................... | E05C 19/18 292/304 |
| 2008/0152457 A1 * | 6/2008 | Schmier | ............... | F16B 19/109 411/348 |
| 2011/0008124 A1 * | 1/2011 | Niklewwicz | .......... | F16B 11/006 |
| 2012/0148339 A1 * | 6/2012 | Wang | .................... | F16B 13/128 411/33 |

(Continued)

*Primary Examiner* — Gary W Estremsky
(74) *Attorney, Agent, or Firm* — Matthias Scholl P.C.; Matthias Scholl (57) ABSTRACT

An expansion connector including an expandable casing, a pushing member, a compression spring, and a connecting rod. The expandable casing includes an expansion end and is in the shape of a hollow cylindrical tube provided with an axial hole and an inner wall defining the axial hole. The connecting rod includes a first end, a second end, and a stopper disposed between the first end and the second end. The pushing member, the compression spring and the connecting rod are disposed in the expandable casing; the expansion end is expandable radially outwards with respect to the axial hole; the pushing member is disposed in the axial hole and abuts against the expansion end; the pushing member includes a first male thread, and the inner wall of the expansion end includes a first female thread corresponding to the first male thread.

9 Claims, 9 Drawing Sheets

(56) References Cited

U.S. PATENT DOCUMENTS

| | | | |
|---|---|---|---|
| 2019/0262890 A1* | 8/2019 | Xing | B21D 39/20 |
| 2020/0063782 A1* | 2/2020 | Bansal | F16B 11/006 |
| 2020/0232494 A1* | 7/2020 | Liu | F16B 37/125 |

* cited by examiner

EXPANSION CONNECTOR

CROSS-REFERENCE TO RELATED APPLICATIONS

Pursuant to 35 U.S.C. § 119 and the Paris Convention Treaty, this application claims foreign priority to Chinese Patent Application No. 201911288930.0 filed Dec. 13, 2019, the contents of which, including any intervening amendments thereto, are incorporated herein by reference.

BACKGROUND

The disclosure relates to the field of fasteners, and more particularly to an expansion connector.

The existing expansion connector includes a connecting rod and an expandable casing surrounded by the connecting rod, which is used to connect a vertical plate and a horizontal plate together. When in use, one end of the expansion connector is inserted into the horizontal plate, the horizontal plate is pushed to move perpendicularly towards the vertical plate, and the other end of the expansion connector is inserted into the vertical plate. However, the expansion connector is unable to fix a horizontal plate between two vertical plates.

SUMMARY

The disclosure provides an expansion connector comprising an expandable casing, a pushing member, a compression spring, and a connecting rod. The expandable casing comprises an expansion end and is in the shape of a hollow cylindrical tube provided with an axial hole and an inner wall defining the axial hole. The connecting rod comprises a first end, a second end, and a stopper disposed between the first end and the second end.

The pushing member, the compression spring and the connecting rod are disposed in the expandable casing; the expansion end is expandable radially outwards with respect to the axial hole; the pushing member is disposed in the axial hole and abuts against the expansion end; the pushing member comprises a first male thread, and the inner wall of the expansion end comprises a first female thread corresponding to the first male thread; the first end of the connecting rod is detachably connected to the pushing member, and the second end extends out of the expandable casing; the expandable casing further comprises a first lug boss and a second lug boss which are disposed on the inner wall along an axial direction of the expandable casing; the stopper is disposed between the first lug boss and the second lug boss; and the compression spring is wrapped around the connecting rod and disposed between the first lug boss and the stopper.

The expandable casing further comprises a first body and a second body detachably connected to the first body via a snap-fit joint.

The first body and/or the second body comprise(s) a through hole, and the second body and/or the first body comprise(s) a positioning block corresponding to the through hole; one end of the positioning block comprises a hook inserted in the through hole thereby integrating the first body with the second body.

The expansion end comprises at least one axial cut adapted to cut the expansion end into at least one first expansion part expandable outwards.

The expansion end further comprises a cylindrical hole and a tapered hole. The tapered hole comprises a first opening, and a second opening communicating with the cylindrical hole. The diameter of the tapered hole decreases from the second opening to the first opening. The first female thread of the expansion end extends from the cylindrical hole to the tapered hole.

The first end of the connecting rod comprises a first hemicylindrical member; the pushing member further comprises a blind hole and a second hemicylindrical member disposed in the blind hole and corresponding to the first hemicylindrical member.

The expansion connector further comprises an embedded part; the second end of the connecting rod comprises a head connected to the embedded part; the embedded part comprises a circumferential wall, a cavity defined by the circumferential wall and configured to accommodate the head, and a front panel comprising a first hole and a second hole communicating with the first hole and smaller than the first hole in size; the first hole is configured to receive the head, and the second hole has a diameter equal to that of the connecting rod.

The embedded part further comprises at least one expansion portion disposed on the circumferential wall; the at least one expansion portion comprises a second expansion part, and a bolt comprising a stem; one end of the second expansion part is connected to the circumferential wall, a gap is disposed between the second expansion part and the circumferential wall; the front panel further comprises a threaded hole; the bolt is in threaded connection to the front panel; when in use, the stem of the bolt extends into the gap between the second expansion part and the circumferential wall to spread out the second expansion part.

The embedded part further comprises a guide plate disposed in the cavity. The guide plate extends obliquely inward along the direction from the first hole to the second hole.

The following advantages are associated with the expansion connector of the disclosure. The expansion connector can be used to assemble and disassemble a side plate and a floor plate. The tip of a phillips screwdriver is aligned with and inserted into the slotted cross. The phillips screwdriver pushes the connecting rod toward the pushing member, and is then turned clockwise to rotate the connecting rod until the first hemicylindrical member fits with the hemicylindrical recess. The phillips screwdriver continues to turn the slotted cross clockwise to push the pushing member into the tapered hole. The tapered hole expands radially outward because of the squeeze of the pushing member and is elastically fixed in the floor plate. The phillips screwdriver continues to turn the slotted cross counterclockwise to pull the pushing member back to the cylindrical hole. The tapered hole is then elastically rest and removed from the floor plate. The connecting rod is movable back and forth in the expandable casing, and is resettable under the action of the restoring force of the compression spring.

In the drawings, the following reference numbers are used: 501. Side plate; 502. Floor plate; 1a. First body; 1b. Second body; 1. Expandable casing; 2. Connecting rod; 3. Embedded part; 4. Pushing member; 41. First male thread; 5. Compression spring; 6. Bolt; 61. Stem; 101. First lug boss; 102. Second lug boss; 11. Expansion end; 110. First female thread; 111. Cylindrical hole; 112. Tapered hole; 113. First expansion part; 114. Axial cut; 12. Through hole; 13. Positioning block; 20. Stopper; 21. Head; 210. Slotted cross; 23. First hemicylindrical member; 301. Second hole; 302. First hole; 303. Guide plate; 31. Front panel; 310. Threaded hole; 34. Circumferential wall; 35. Second expansion part; 36. Gap.

DETAILED DESCRIPTION OF THE EMBODIMENTS

Referring to FIGS. 1-5, the disclosure provides an explosion connector comprising an expandable casing 1 comprising an expansion end 11, a pushing member 4, a compression spring 5, and a connecting rod 2. The expandable casing 1 is a hollow cylindrical tube comprising an axial hole and an inner wall defining the axial hole. The expansion end 11 is expandable radially outwards with respect to the axial hole. The pushing member 4, the compression spring 5 and the connecting rod 2 are disposed in the expandable casing 1. The pushing member 4 is disposed in the axial hole and abuts against the expansion end 11, and comprises a first male thread 41, and the inner wall of the expansion end comprises a first female thread corresponding to the first male thread. The connecting rod 2 comprises a first end, a second end, and a stopper 20 disposed between the first end and the second end. The first end of the connecting rod 2 is detachably connected to the pushing member 4, and the second end extends out of the expandable casing 1. When the first end of the connecting rod 2 is plugged into the pushing member 4, the connecting rod 2 is rotated and drives the pushing member 4 to rotate simultaneously. The expandable casing 1 further comprises a first lug boss 101 and a second lug boss 102 which are disposed on the inner wall along an axial direction of the expandable ring. The stopper 20 slides between the first lug boss 101 and the second lug boss 102. The compression spring is wrapped around the connecting rod 2 and disposed between first lug boss 101 and the stopper 20. The second lug boss 102 is configured to restrict the position of the stopper 20 and prevents the connecting rod 2 from escaping from the compression spring 5.

Figure 4:
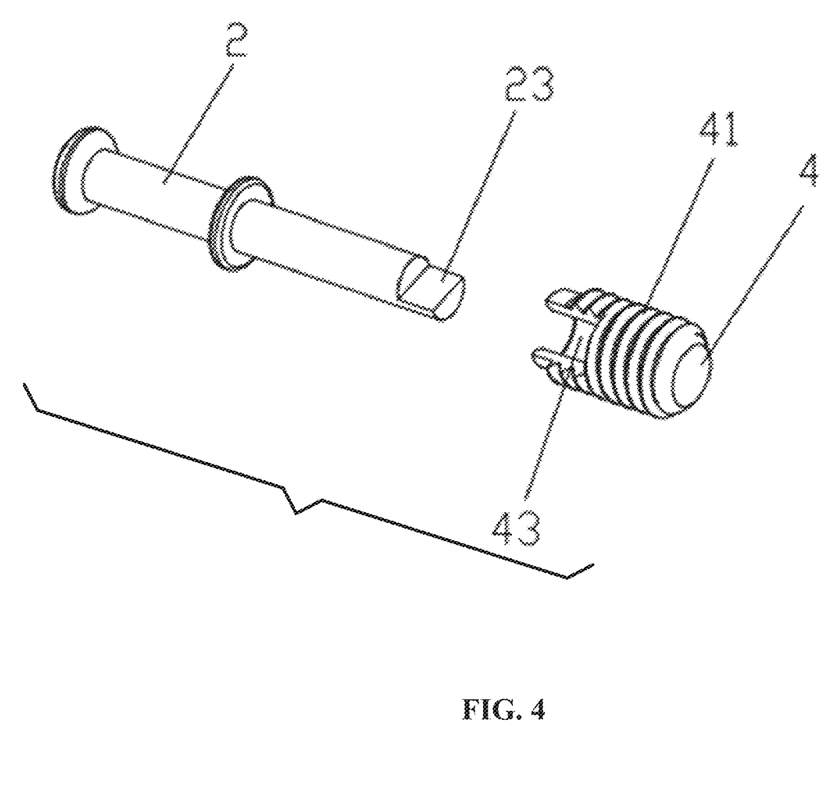
FIG. 4 is an exploded view of a connecting rod and a pushing member of an expansion connector of the disclosure.

Referring to FIG. 4, the first end of the connecting rod 2 is detachably connected to the pushing member 4 via a plug-type joint. The first end of the connecting rod 2 comprises a first hemicylindrical member 23. The pushing member 4 further comprises a blind hole 43 and a second hemicylindrical member (not labelled in figures) disposed in the blind hole and corresponding to the first hemicylindrical member. The first hemicylindrical member 23 can be inserted into and fits with the second hemicylindrical member.

Figure 5:
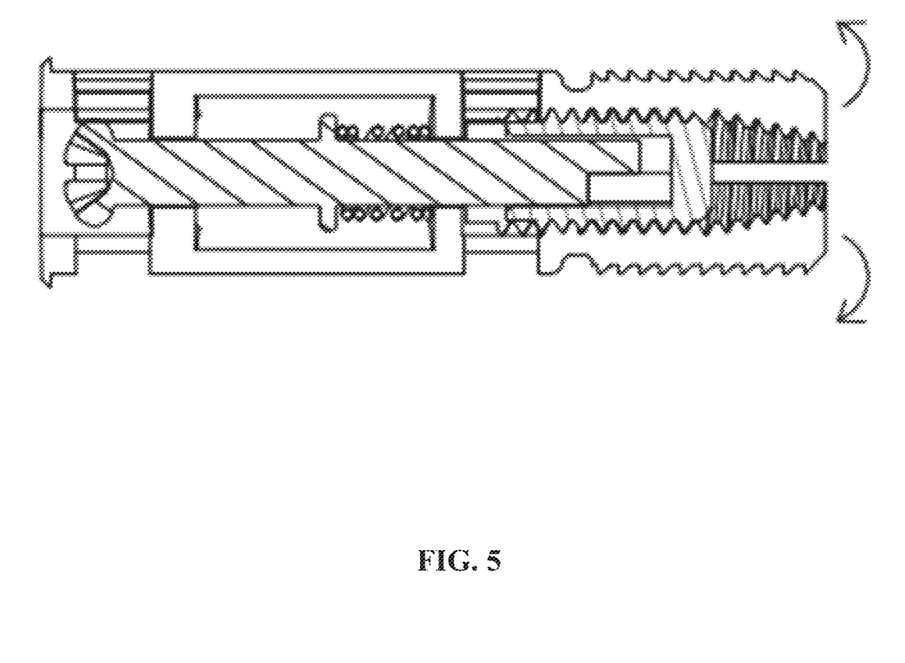
FIG. 5 is across-sectional view taken long the axial line of an expansion end of an expansion connector of the disclosure.

The expansion end 11 further comprises a cylindrical hole 111 and a tapered hole 112. The tapered hole 112 comprises a first opening, and a second opening communicating with the cylindrical hole 111. The diameter of the tapered hole 112 gradually decreases from the second opening to the first opening. The first female thread 110 of the expansion end 11 extends from the cylindrical hole 111 to the tapered hole 112.

The expansion end 11 comprises at least one axial cut 114. The at least one axial cut 114 divides the expansion end 11 into at least one first expansion part 113 extending in the axial direction of the expansion end 11 and capable of expanding outwards. The number of the first expansion part 113 can be any suitable number, such as one, two, three, etc. In certain embodiments, the expansion end 11 has four first expansion parts 113 each comprising the first thread on the outer surface thereof for increasing the friction between two surfaces.

Referring to FIG. 5, the second end of the connecting rod 2 further comprises a head 21 configured to connect to an embedded part. The head 21 comprises a slotted cross 210. A tip of a phillips screwdriver is inserted into the slotted cross 210. The phillips screwdriver pushes the connecting rod 2 toward the pushing member 4, and is then turned clockwise to rotate the connecting rod 2 until the first hemicylindrical member 23 fits with the second hemicylindrical member. The phillips screwdriver continues to turn the slotted cross 210 clockwise to push the pushing member 4 into the tapered hole 112. The tapered hole 112 expands radially outward because of the squeeze of the pushing member 4 and is elastically fixed in the floor plate 502. When the phillips screwdriver is removed, the connecting rod 2 is reset due to the restoring force of the compression spring 5, and the stopper 20 is stuck by the second lug boss 102. The first end of the connecting rod 2 is separated from the pushing member 4, and the second end extends out of the expandable casing 1. In certain embodiments, when a worker has to remove the expansion connector 2 from a floor plate 502, the tip of the phillips screwdriver is inserted into the slotted cross 210. The phillips screwdriver pushes the connecting rod 2 toward the pushing member 4, and is turned clockwise to rotate the connecting rod 2 until the first hemicylindrical member 23 fits with the second hemicylindrical member. The phillips screwdriver continues to turn the slotted cross 210 counterclockwise to pull the pushing member 4 back to the cylindrical hole 111. The tapered hole 112 is then elastically rest and removed from the floor plate 502.

Figure 1:
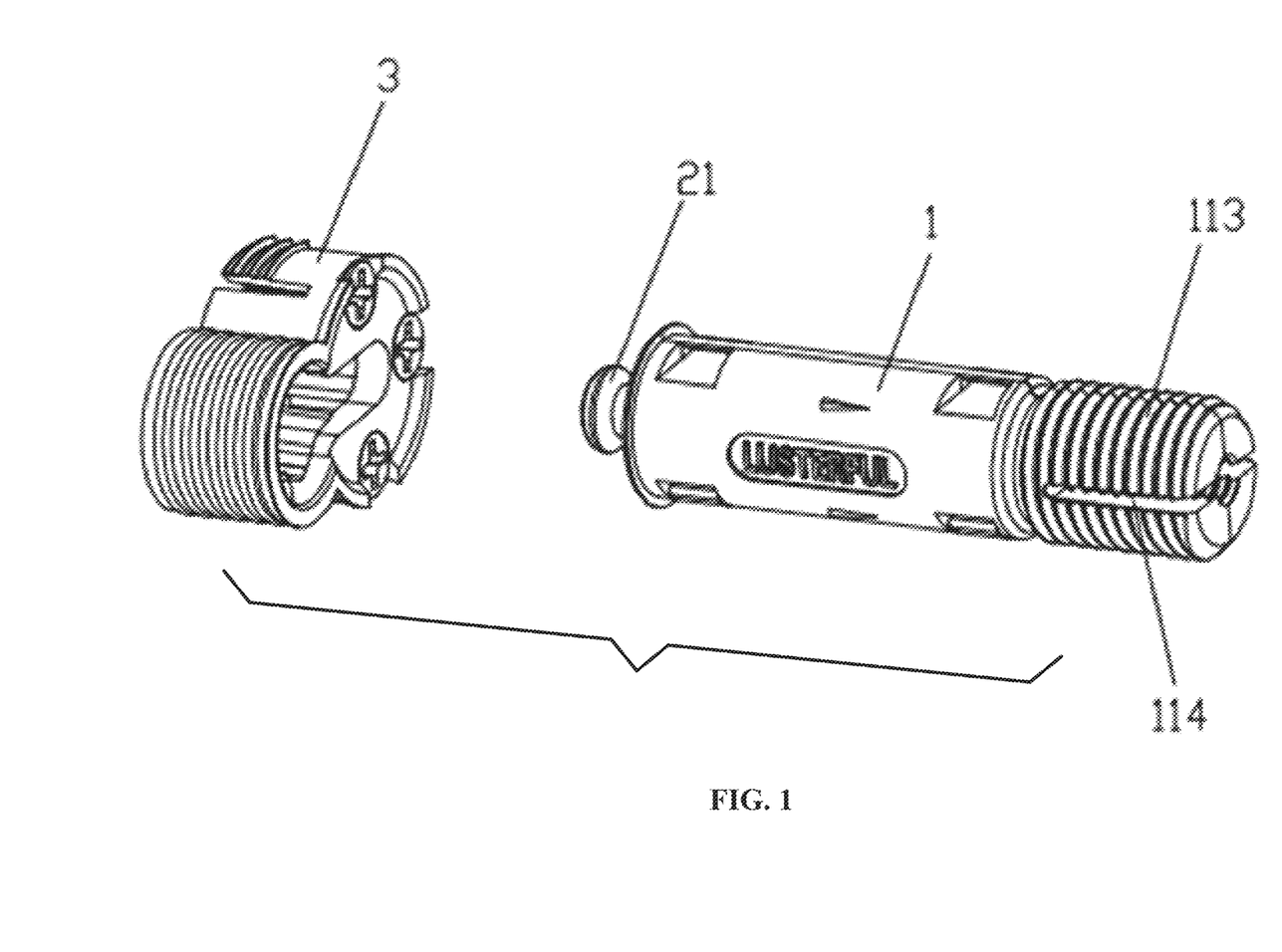
FIG. 1 is schematic diagram of an expansion connector and an embedded part of the disclosure.
Figure 2:
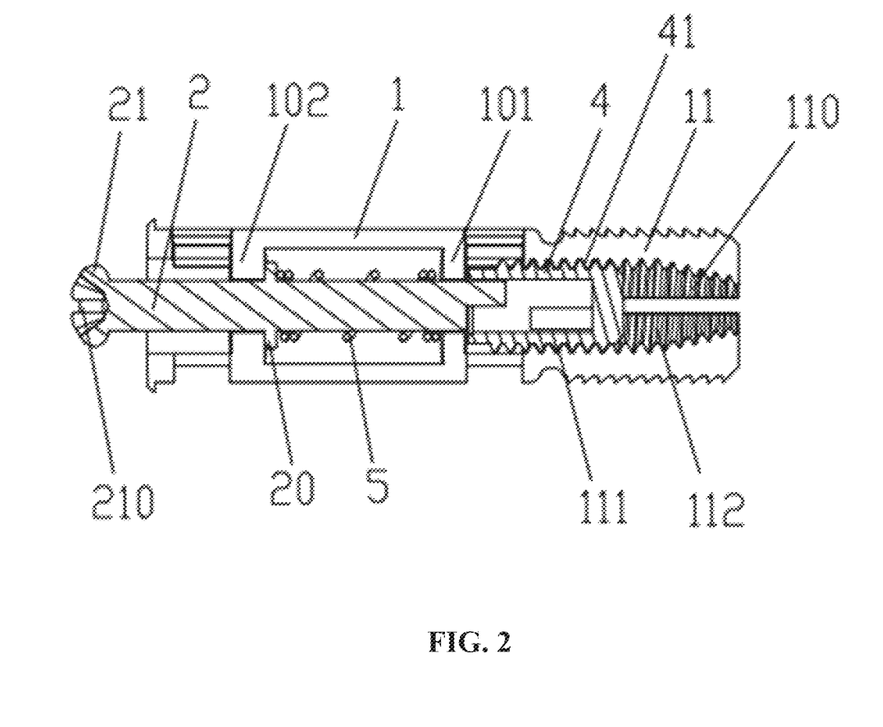
FIG. 2 is across section view of an expansion connector of the disclosure.
Figure 3:
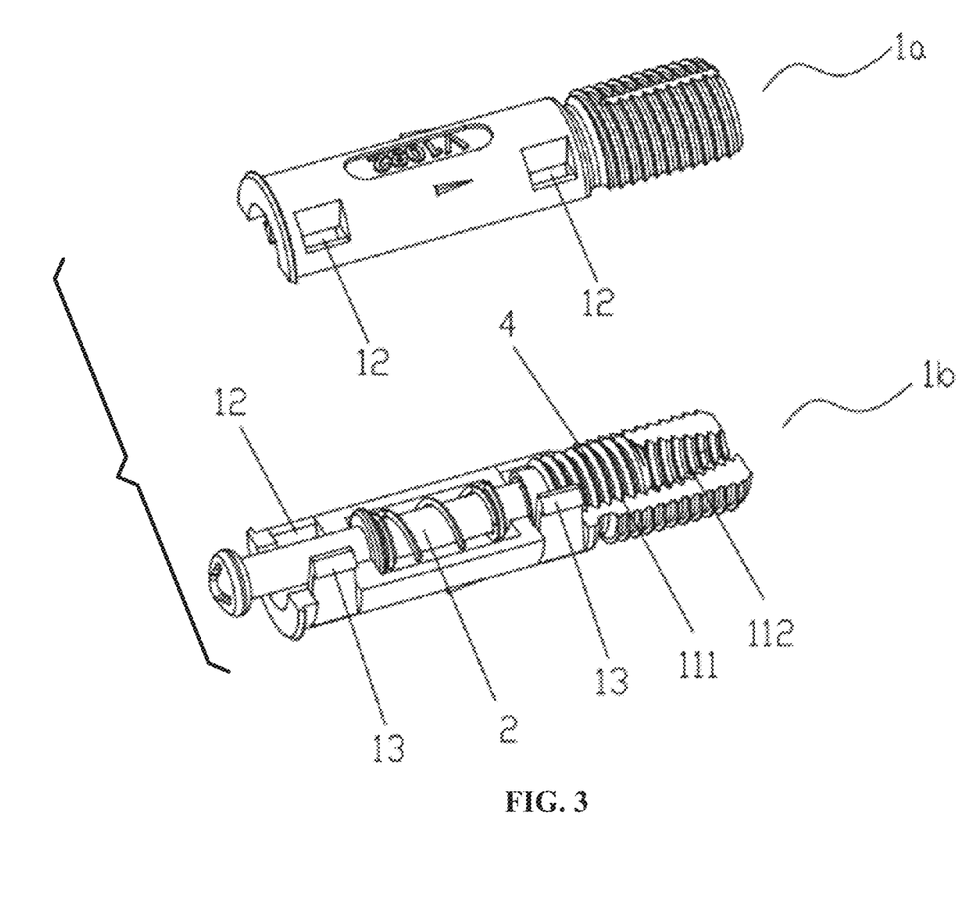
FIG. 3 is an exploded view of an expansion connector of the disclosure.

Referring to FIG. 3, the expandable casing 1 further comprises a first body 1a, and a second body 1b detachably connected to the first body 1a via a snap-fit joint. The first body 1a and/or the second body 1b comprise(s) a through hole 12, and the second body and/or the first body comprise(s) a positioning block 13 corresponding to the through hole. One end of the positioning block comprises a hook inserted in the through hole 12 thereby integrating the first body with the second body.

Figure 7:
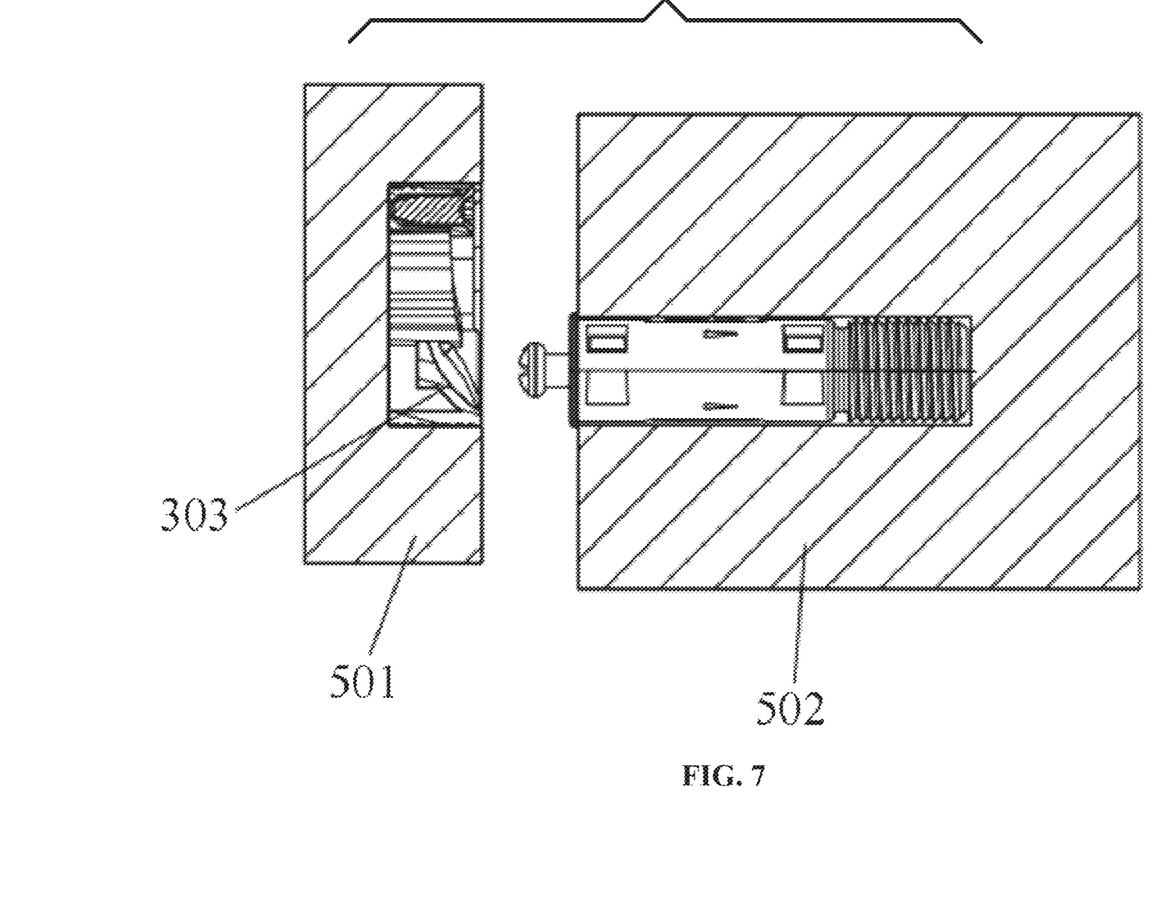
FIG. 7 is a first schematic view of use of an expansion connector of the disclosure for installation.

The second end of the connecting rod 2 further comprises a head 21 configured to connect to an embedded part 3. Referring to FIG. 7, the embedded part 3 comprises a circumferential wall 34, a cavity defined by the circumferential wall and configured to accommodate the head, and a front panel 31 comprising a first hole 302, and a second hole 301 communicating with the first hole 302 and smaller than the first hole 302 in size. The first hole 302 is configured to receive the head 21, and the second hole 301 has a diameter equal to that of the connecting rod 2. The head 21 is inserted into the cavity via the first hole 302, and slides from the first hole 302 to the second hole 301, so that the head 21 is stuck in the embedded part 3 by the front panel 31. Alternatively, the side plate 501 comprising a mounting hole (i.e. without the embedded part 3), can be directly connected to the connecting rod 2. But the embedded part 3 fitting with the head 21 can increase the stability of the joint between the side plate 501 and the floor plate 502.

Figure 6:
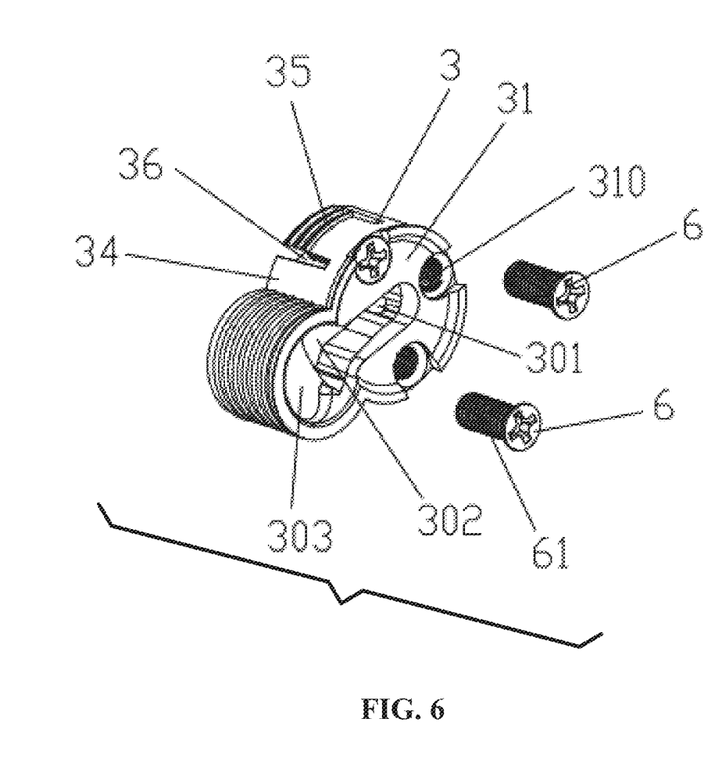
FIG. 6 is an exploded view of an embedded part of an expansion connector of the disclosure.

The embedded part 3 further comprises at least one expansion portion disposed on the circumferential wall 34. The at least one expansion portion comprises a second expansion part 35, and a bolt comprising a stem 61. One end of the second expansion part 35 is connected to the circumferential wall 34. A gap is disposed between the second expansion part 35 and the circumferential wall 34. The front panel further comprises a threaded hole 310 comprising a second female thread, and the bolt is in threaded connection to the front panel. The stem 61 comprises a second male thread corresponding to the second female thread. When in use, the bolt 6 is screwed into the threaded hole 310 with a screwdriver, and the stem 61 of the bolt extends into the gap between the second expansion part and the circumferential wall to spread out the second expansion part, so that the embedded part 3 is elastically fixed in the mounting hole of the side plate 501.

The embedded part 3 further comprises a guide plate 303 disposed in the cavity. The guide plate 303 extends obliquely inwards along the direction from the first hole 302 to the second hole 301. The guide plate 303 is configured to lead the head 21 into the embedded part 3. And when the head 21 is removed from the embedded part 3, the guide plate 3 helps eject the head, thereby facilitating the assembly and disassembly of the expansion connector.

Figure 8:
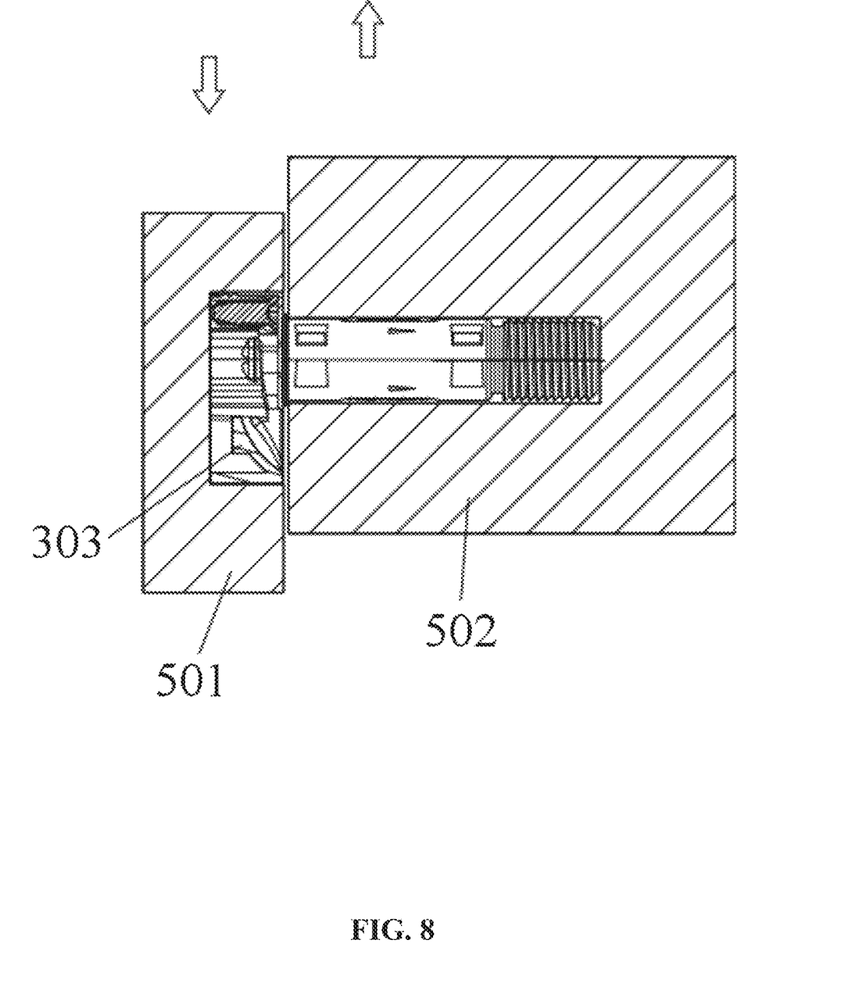
FIG. 8 is a second schematic view of use of an expansion connector of the disclosure for installation.

Referring to FIGS. 7 and 8, the expansion connector is installed as follows:

1. punching holes in the side plate 501 and the floor plate 502, respectively;

2. placing the embedded part 3 in the mounting hole of the side plate 501, and tightening the bolt 6; placing the expansion connector in the floor plate 502, and inserting the tip of the phillips screwdriver into the slotted cross 210; pushing the connecting rod 2 toward the pushing member 4 with the phillips screwdriver; turning the slotted cross 210 clockwise to rotate the connecting rod 2 until the first hemicylindrical member 23 fits with the second hemicylindrical member; and turning the slotted cross 210 clockwise to push the pushing member 4 into the tapered hole 112; therefore, the tapered hole 112 expands radially outward because of the squeeze of the pushing member 4 and is elastically fixed in the floor plate 502;

3. placing the floor plate 502 comprising the expansion connector perpendicular to the side plate 501; pushing the floor plate 502 toward the side plate 501; inserting the head 21 into the first hole 302; sliding the head 21 from the first hole 302 along the guide plate 303 to the second hole 301; therefore, the head 21 is stuck in the embedded part 3 the front panel 31, and the floor plate 502 is elastically fixed in the side plate 501.

Figure 9:
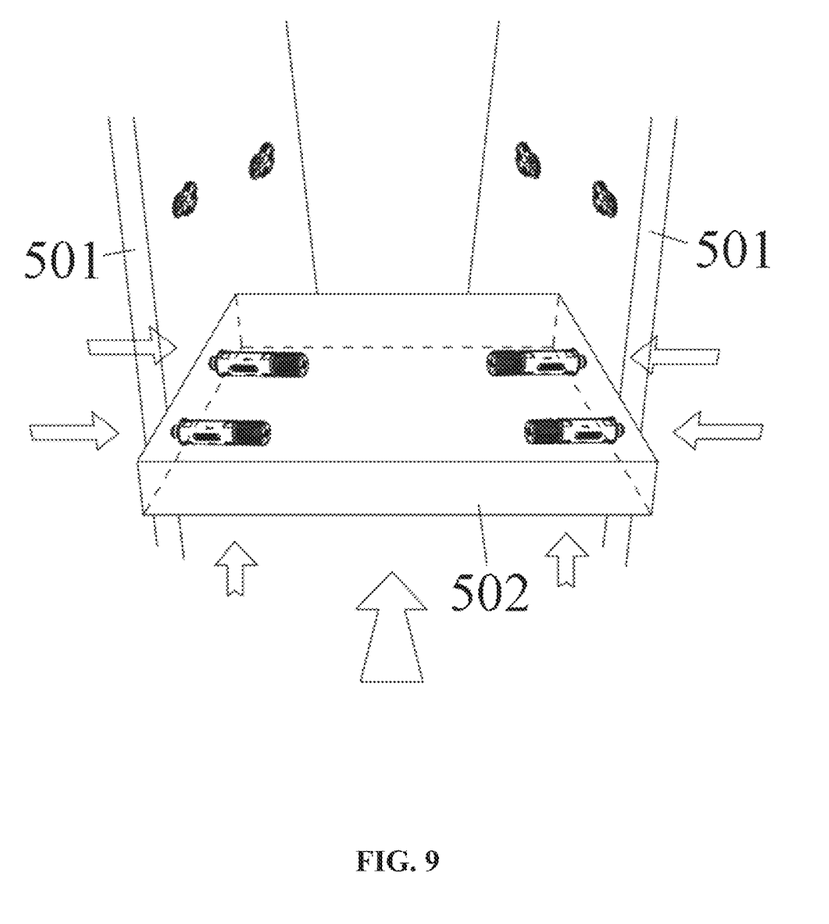
FIG. 9 is a third schematic view of use of an expansion connector of the disclosure for installation.

Referring to FIG. 9, when a worker has to fix a floor plate 502 between two side plates 501, the expansion connector is inserted into the mounting holes on both sides of the floor plate 502. The floor plate 502 comprising the expansion connector is placed perpendicular to the side plate 501, and the head 21 of the connecting rod 2 is aligned with and inserted into the first hole 302 of the embedded part 3. The head 21 is stuck in the embedded part 3 to connect the floor plate 502 to the side floor 501. When a worker has to remove the floor plate 502 from the side plate 501, the head 21 is moved by the worker from the second hole 301 along the guide plate 303 to the first hole 302, so that the connecting rod 2 escapes from the side plate 501, and the side plate 501 and the floor plate 502 can be recycled.

It will be obvious to those skilled in the art that changes and modifications may be made, and therefore, the aim in the appended claims is to cover all such changes and modifications.

What is claimed is:

1. A device, comprising:
    an expandable casing comprising an expansion end;
    a pushing member;
    a compression spring; and
    a connecting rod comprising a first end, a second end, and a stopper disposed between the first end and the second end;
wherein:
    the expandable casing is a hollow cylindrical tube comprising an axial hole and an inner wall defining the axial hole;
    the pushing member, the compression spring and the connecting rod are disposed in the expandable casing;
    the expansion end is expandable radially outwards with respect to the axial hole;
    the pushing member is disposed in the axial hole and abuts against the expansion end;
    the pushing member comprises a first male thread, and the inner wall of the expansion end comprises a first female thread corresponding to the first male thread;
    the first end of the connecting rod is detachably connected to the pushing member, and the second end extends out of the expandable casing;
    the expandable casing further comprises a first lug boss and a second lug boss which are disposed on the inner wall along an axial direction of the expandable casing;
    the stopper is disposed between the first lug boss and the second lug boss; and
    the compression spring is wrapped around the connecting rod and disposed between first lug boss and the stopper.

2. The device of claim 1, wherein the expandable casing further comprises a first body and a second body detachably connected to the first body via a snap-fit joint.

3. The device of claim 2, wherein the first body and/or the second body comprise(s) a through hole, and the second body and/or the first body comprise(s) a positioning block corresponding to the through hole; one end of the positioning block comprises a hook inserted in the through hole thereby integrating the first body with the second body.

4. The device of claim 1, wherein the expansion end comprises at least one axial cut adapted to cut the expansion end into at least one first expansion part expandable outwards.

5. The device of claim 4, wherein the axial hole in the expansion end comprises a cylindrical hole and a tapered hole; the tapered hole comprises a first opening, and a second opening communicating with the cylindrical hole; a diameter of the tapered hole decreases from the second opening to the first opening; and the first female thread of the expansion end extends from the cylindrical hole to the tapered hole.

6. The device of claim 1, wherein the first end of the connecting rod comprises a first hemicylindrical member; the pushing member further comprises a blind hole and a second hemicylindrical member disposed in the blind hole and corresponding to the first hemicylindrical member.

7. The device of claim 1, wherein the device further comprises an embedded part; the second end of the connecting rod comprises a head connected to the embedded part; the embedded part comprises a circumferential wall, a cavity defined by the circumferential wall and configured to accommodate the head, and a front panel comprising a first hole and a second hole communicating with the first hole and smaller than the first hole in size; the first hole is configured to receive the head, and the second hole has a diameter equal to that of the connecting rod.

8. The device of claim 7, wherein the embedded part further comprises at least one expansion portion disposed on the circumferential wall; the at least one expansion portion comprises a second expansion part, and a bolt comprising a stem; one end of the second expansion part is connected to the circumferential wall; a gap is disposed between the second expansion part and the circumferential wall; the front panel further comprises a threaded hole; the bolt is in threaded connection to the front panel; when in use, the stem of the bolt extends into the gap between the second expansion part and the circumferential wall to spread out the second expansion part.

9. The device of claim 7, wherein the embedded part further comprises a guide plate disposed in the cavity; the guide plate extends obliquely inwards along a direction from the first hole to the second hole.

\* \* \* \* \*